May 8, 1962 C. F. KRAMER 3,033,304
BATTERY HOLD-DOWN
Filed March 7, 1960
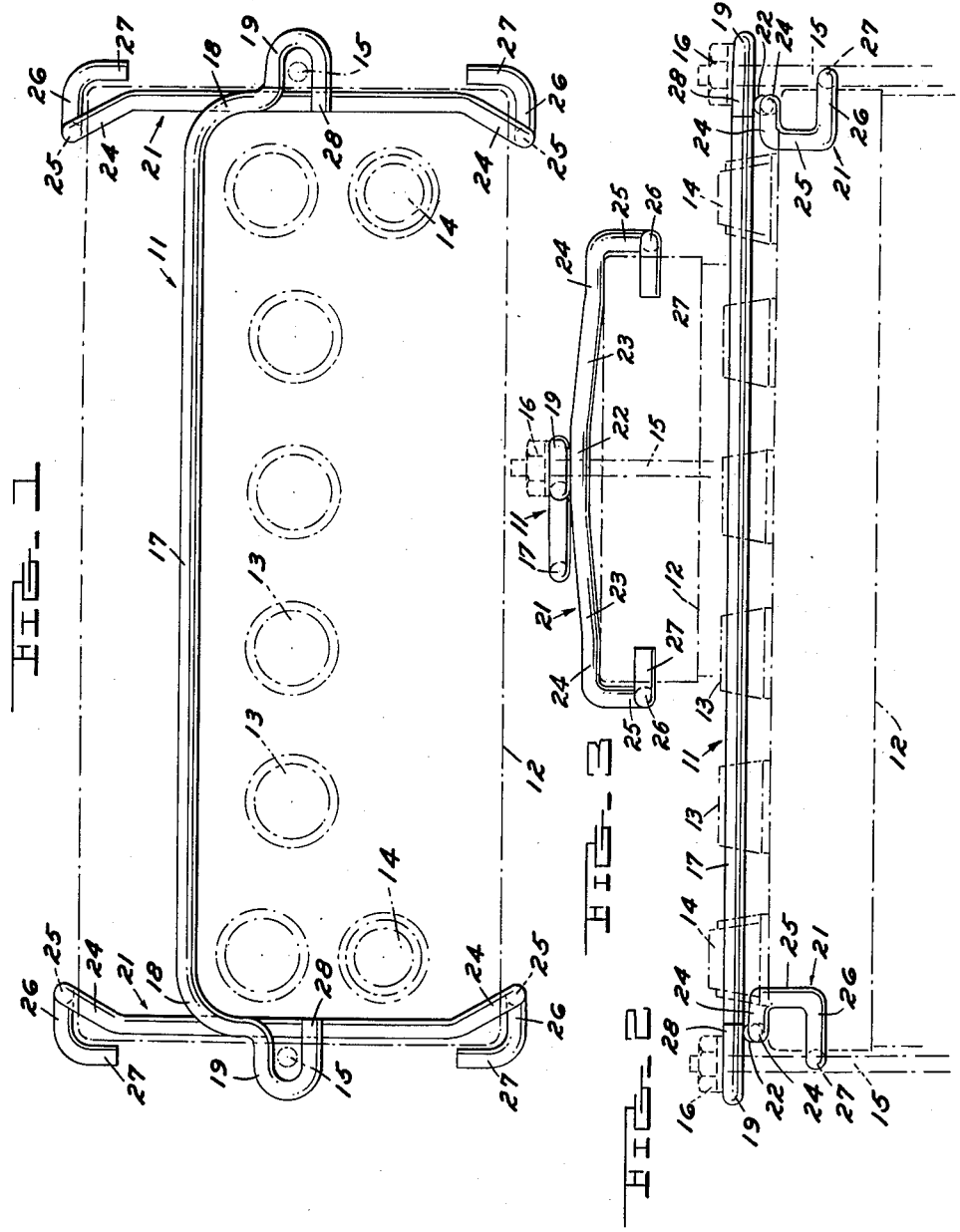
CLARENCE F. KRAMER
INVENTOR.
BY J. R. FAULKNER
J. J. ROETHEL
ATTORNEYS

United States Patent Office 3,033,304
Patented May 8, 1962

3,033,304
BATTERY HOLD-DOWN
Clarence F. Kramer, Birmingham, Mich., assignor to Ford Motor Company, Dearborn, Mich., a corporation of Delaware
Filed Mar. 7, 1960, Ser. No. 13,142
6 Claims. (Cl. 180—68.5)

The present invention relates to a vehicular battery hold-down clamp.

In conventional vehicular battery installation, the battery is supported in the vehicle engine compartment on a battery carrier or tray mounted on a bracket secured to the sheet metal structure, such as the front fender apron, forming a wall of the engine compartment. The battery is held down in the support tray by some form of a hold-down clamp device which straddles the upper portion of the battery case. Hold-down pressure is applied through elongated clamp bolts extending between the battery carrier tray and bolt loops in the hold-down clamp device, suitable nuts or the like being provided to apply the clamping pressure.

It is an object of the present invention to provide an improved battery clamp device formed of suitable thick wire or metal rod stock. The improved construction and arrangement comprises a longitudinally extending rod formed with a bolt loop at each of its ends. A preformed wire or rod member is welded to the longitudinal rod at each end with the longitudinal axes of these members extending laterally of the longitudinal axis of the main rod portion. The end members are adapted to rest on the upper edge of the battery at each of its ends and each end member is provided with formed end portions adapted to straddle the upper end corners of the battery. Each member is arched so that the hold-down load is placed on the battery corners. Also, the wire or rod arch acts as a cushion to take up torsional loads on the battery case as the vehicle operates over uneven terrain. The entire welded wire or rod assembly is dip insulated for corrosion protection and cushion effect where it contacts the battery case.

Other objects, advantages and features of the present invention will be made more apparent as this description proceeds, particularly when considered in connection with the accompanying drawing wherein:

FIG. 1 is a plan view of the preferred form of the battery hold-down clamp embodying the present invention, the battery being shown in dot-dash outline;

FIG. 2 is a side view of the battery hold-down clamp shown in FIG. 1; and

FIG. 3 is an end view of the battery hold-down clamp.

Referring now to the drawing, the hold-down clamp, generally designated 11, is illustrated as longitudinally straddling a conventional vehicular battery 12, shown in dot and dash outline. The battery 12 is provided with a series of filler caps 13 and a pair of terminals 14, the latter being located one at each end of the battery case. Also shown in dot and dash outline are a pair of vertically extending hold-down studs 15 connected in any suitable manner to the rim or base of a battery support tray (not shown). Suitable nuts 16 or the like are threadedly engaged with the upper end of each hold-down stud. The hold-down studs are generally located on the longitudinal center line of the battery support tray and thus are substantially in alignment with the longitudinal center line of the battery when the latter is positioned in the support tray. The filler caps 13 also lie along the line which is substantially in alignment with the longitudinal center line of the battery case.

The battery hold-down clamp 11 comprises a longitudinally extending wire or rod 17 having at each of its ends a substantially 90° bend 18. Each bend 18 terminates in a substantially U-shaped end portion 19 forming a loop adapted to receive the hold-down studs 15. The purpose of the bend 18 at each end of the rod 17 is to laterally offset the longitudinal axis of each U-shaped end portion 19 from the longitudinal axis of the rod 17. This permits the rod 17 to overlie the battery casing along one side of the filler caps 13 while the loops formed by the U-shaped end portions 19 accommodate the longitudinally centralized location of the hold-down studs 15.

Actual clamping pressure is applied to the battery casing through a pair of symmetrically formed clamping members, generally designated 21. These clamping members are welded to the end portions 18 of the rod 17. The clamp members are formed of wire or rod stock similar to that used for the wire or rod 17. Each clamp member 21 is formed with a center section 22 having its longitudinal axis lying, when in use, in a substantially horizontal plane, as best seen in FIG. 3. At each side of the center section, each clamp member is provided with a downwardly extending or inclined section 23 which terminates in a further horizontally extending section 24. As best seen in FIG. 1, each section 24 is at an angle to the longitudinal axis of the center section 22 and inclined sections 23 of the clamp member 21. That is, each section 24 may be said to be inwardly bent in a horizontal plane so as to cut across a corner of the upper surface of the battery casing to be held down by the battery hold-down clamp 12.

Each end section 24 terminates in a vertically depending leg portion 25. The vertically depending leg portion 25 is adapted to extend for a short distance along the vertical side of the corner portion of the battery 12. Each vertically depending leg portion 25 terminates in a horizontally extending end portion 26 having a right angle bend 27 therein. As best seen in FIG. 1, each end portion 26 extends from the depending leg portion 25 back in the direction of the corner edge of the battery casing 12 and around the corner for a short distance. Thus, the end of each clamp member 21 has a portion overlying the top surface of each corner portion of the battery, extending down a side of each corner portion and then extending around each corner portion a short distance below the top thereof.

It will be noted that the center section 22 of each clamp device 21 is welded to the end portion 19 of the rod 17 so as to extend across the opening of the U-shaped end portion 19. In other words, the center section 22 of the clamp member 21 is welded to the end portion 28 of the U-shaped end portion 19 and to the laterally extending portion of the bend 18 at each end of the rod 17. The clamp device 21 is welded to the underside of the rod 17.

The use of the present battery hold-down clamp device is believed readily apparent. The battery is placed in the support tray. The clamp device is then placed down over the battery so that each corner of the clamp members 21 straddles a corner of the battery casing. The hold-down studs are projected through the U-shaped end portions 19 or loop forming portions and the nuts 16 are then applied and tightened down. When the clamp device 11 is positioned over the battery, as shown in the drawings, the main longitudinal portion of the rod 17 is raised above the top surface of the battery. This is an advantage because usually the center or cell covering portion of the battery is structurally weak.

The wire arch effect formed by the straight center section 22 and the angularly inclined adjacent sections 23 of the clamp members 21 also provides several advantages. First, all of the hold-down load applied by each clamp member 21 is applied to the corners of the battery casing. The wire arch has the further advantage that it acts as a cushion to take up torsional loads on the battery case as the vehicle operates over uneven terrain.

The clamp device, after assembly of the rod 17 and the end clamp members 21 is preferably dip-insulated in a suitable acid resistant plastic or rubber material. The dip-insulation provides corrosion protection and cushion effect for the clamp where it contacts the battery case.

It will be understood that the invention is not to be limited to the exact construction shown and described, but that various changes and modifications may be made without departing from the spirit and scope of the invention, as defined in the appended claims.

I claim:

1. A hold-down clamp for a vehicular battery comprising a rod member adapted to longitudinally straddle said battery, said rod member being provided with bolt receiving loop portions at each end thereof, and a formed rod member secured to said first mentioned rod member at each of its ends, the longitudinal axes of said formed rod members being substantially parallel to each other and normal to the longitudinal axis of said first mentioned rod member, each formed rod member having its respective ends formed to hook around a corner portion of said battery to restrain the latter against lateral and endwise movement, the center section of each formed rod member being in arched relation to the edge surface of the respective end of said battery so that hold-down pressure is exerted only by end sections of said formed rod members engaging the corners of said battery.

2. A hold-down clamp for a vehicle battery comprising an enlongated member provided with bolt receiving loop portions at each of its ends, cross members secured to each end of said elongated member inwardly of its said ends, each cross member having an arched section intermediate its ends and said elongated member being secured to the upper side of said arched section, said elongated member being spaced from the upper surface of said battery when the end portions of said cross members rest on the top corner surfaces of said battery thereby to substantially concentrate hold-down pressure at the corners of said battery.

3. A hold-down clamp for a vehicle battery comprising an elongated member provided with bolt receiving loop portions at each of its ends, cross members secured to each end of said elongated member inwardly of its said ends, each cross member having an arched section intermediate its ends and said elongated member being secured to the upper side of said arched section, said elongated member being spaced from the upper surface of said battery when the end portions of said cross members rest on the top corner surfaces of said battery thereby to concentrate the hold-down pressure at the corners of said battery, each cross member end portion terminating in a hook portion extending down and around a corner of said battery to restrain the latter against lateral and endwise movement.

4. A hold-down clamp for a vehicular battery comprising a rod member straddling said battery, said rod member being provided with bolt receiving loop portions at each end overhanging the edges of said battery, and formed rod members carried on said first mentioned rod member inwardly of each loop portion adjacent said edges of said battery, said formed rod members having end sections thereof abutting the top surface of said battery and the section intermediate said end sections in spaced relation to said top surface whereby downward pressure is exerted on said battery substantially at only the corners thereof by said formed rod member end sections, each formed rod member having its terminal ends formed to hook down and around a corner portion of said battery to restrain the latter against lateral and endwise movement.

5. A hold-down clamp for a vehicle battery comprising an assembly of an elongated member and cross members secured to each end of said elongated member inwardly of its ends, each cross member having an arched section intermediate its ends and said elongated member being secured to the upper side of said arched section, said elongated member being in spaced relation to the upper surface of said battery when end portions of said cross members rest on top corners of said battery thereby to concentrate the hold-down pressure at the corners of said battery, said assembly being formed with loop portions overhanging the ends of said battery adapted to receive bolt devices for exerting hold-down pressure.

6. A hold-down clamp for a vehicle battery comprising an assembly of an elongated member and cross members secured to each end of said elongated member inwardly of its ends, each cross member having an arched section intermediate its ends and said elongated member being secured to the upper side of said arched section, said elongated member being in spaced relation to the upper surface of said battery when end portions of said cross members rest on top corners of said battery thereby to concentrate the hold-down pressure at the corners of said battery, said assembly being formed with loop portions overhanging the ends of said battery adapted to receive bolt devices for exerting hold-down pressure, each cross member having its terminal ends formed to hook around a corner portion of said battery to restrain the latter against lateral and endwise movement.

References Cited in the file of this patent

UNITED STATES PATENTS

| | | |
|---|---|---|
| 449,326 | Kennedy et al. | Mar. 31, 1891 |
| 2,326,481 | Meyer | Aug. 10, 1943 |
| 2,382,428 | Leuvelink | Aug. 14, 1945 |
| 2,849,074 | Key et al. | Aug. 26, 1958 |
| 2,853,143 | Bergman | Sept. 23, 1958 |